United States Patent
Shur et al.

(10) Patent No.: US 7,437,367 B2
(45) Date of Patent: Oct. 14, 2008

(54) PACK URI SCHEME TO IDENTIFY AND REFERENCE PARTS OF A PACKAGE

(75) Inventors: Andrey Shur, Redmond, WA (US);
Bruce A. MacKenzie, Sammamish, WA (US); David B. Ornstein, Seattle, WA (US); Jerry J. Dunietz, Seattle, WA (US); Young Gah Kim, Bothell, WA (US); Sarjana B. Sheth, Redmond, WA (US); Alexei Vladimirovich Vopilov, Redmond, WA (US)

(73) Assignee: Microsoft Corporation, Remond, WA (US)

( * ) Notice: Subject to any disclaimer, the term of this patent is extended or adjusted under 35 U.S.C. 154(b) by 338 days.

(21) Appl. No.: 11/111,735

(22) Filed: Apr. 22, 2005

(65) Prior Publication Data

US 2006/0242105 A1    Oct. 26, 2006

(51) Int. Cl.
G06F 7/00  (2006.01)
G06F 17/30 (2006.01)
G06F 15/16 (2006.01)

(52) U.S. Cl. .................. 707/10; 707/9; 707/1; 709/203
(58) Field of Classification Search ........................ None
See application file for complete search history.

(56) References Cited

U.S. PATENT DOCUMENTS 6,028,279 A * 2/2000 Suryan et al. ............... 200/524
6,233,606 B1 * 5/2001 Dujari ......................... 709/213
6,275,829 B1 * 8/2001 Angiulo et al. ............ 707/104.1
6,549,773 B1    4/2003 Linden et al.
6,591,260 B1    7/2003 Schwarzhoff et al.
6,944,658 B1 * 9/2005 Schneider ................... 709/224
7,010,568 B1 * 3/2006 Schneider et al. ........... 709/203
7,010,580 B1 * 3/2006 Fu et al. ...................... 709/217
2002/0062320 A1 * 5/2002 Shimojima et al. ........ 707/104.1
2003/0112792 A1 * 6/2003 Cranor et al. ............... 370/352
2003/0182305 A1 * 9/2003 Balva et al. ............. 707/103 R
2003/0204529 A1   10/2003 Hertling et al.
2005/0188203 A1 * 8/2005 Bhaskaran et al. .......... 713/176

OTHER PUBLICATIONS

"RFC 2396-Uniform Resource Identifier (URI): Generic Syntax", Xerox corporation, Aug. 1998; T. Berners-Lee et al.*

* cited by examiner

*Primary Examiner*—Miranda Le
*Assistant Examiner*—Daniel Kuddus
(74) *Attorney, Agent, or Firm*—Shook, Hardy & Bacon LLP (57) ABSTRACT

The present invention is directed to a system and method for providing access to individual resources stored within a package. The system enables a client to access the resources without having to access the entire package. The system allows a client to reference the different resources within the package through use of a URI scheme. The URI scheme of the present invention is composed through a method of combining the URI for the package and the URI for the resource. The URI scheme of the present invention is able to work with any scheme, thereby enabling the URI scheme to be universal and not protocol-specific.

13 Claims, 6 Drawing Sheets

```
pack URI            = pack://<authority><abs_path>
where
<authority>         = *(unreserved | escaped | "$" | "," | ";" | ":" | "&" | "=" | "+")
<abs_path>          = "/" <path_segments>
<path_segments>     = segment *("/" <segment>)
<segment>           = *(unreserved | escaped | ":" | "@" | "&" | "=" | "+" | "$" | ",")
```

FIG. 3 pack://http:,,,www.microsoft.com,my.container/a/b/foo.xaml  ← 401
- this URI identifies "/a/b/foo.xaml" part within
"http://www.microsoft.com/my.container" package resource.

pack://http:,,,www.microsoft.com,my.container  ← 402
pack://http:,,,www.microsoft.com,my.container/
- these URIs both identify "http://www.microsoft.com/my.container".

FIG. 4

Package URI      = http://www.my.com/my.package
Relative reference = ./a/foo.xaml
Pack URI         = pack:// http:,,www.my.com,my.package/a/foo.xaml Package URI      = http://www.my.com/packages.aspx?my.package
Relative reference = ./a/foo.xaml
Pack URI         = pack:// http:,,www.my.com,packages.aspx%3fmy.package/a/foo.xaml Package URI      = sql://serro:47serro11@localhost/ser
Relative reference = ./a/b/foo.xaml
Pack UR          = pack://sql:,,serro:47serro11%40localhost,ser/a/b/foo.xaml

FIG. 5

Pack URI         = pack://http:,,www.my.com,packages.aspx%3fmy.package/a/b/foo.xaml
components:
authority        = http:,,www.my.com,packages.aspx%3fmy.package
path             = /a/b/foo.xaml
converted to:
Package URI      = http://www.my.com/packages.aspx?my.package
Part name        = /a/b/foo.xaml

PACK URI SCHEME TO IDENTIFY AND REFERENCE PARTS OF A PACKAGE

CROSS-REFERENCE TO RELATED APPLICATION

The present application is related to co-pending application, Ser. No. 11/111,882, filed Apr. 22, 2005, entitled "Efficiently Describing Relationships Between Resources," which is incorporated herein by reference.

STATEMENT REGARDING FEDERALLY SPONSORED RESEARCH OR DEVELOPMENT

Not applicable.

FIELD OF THE INVENTION

Embodiments of the present invention relate to a system and method for selectively identifying and accessing a resource within a package, without having to access the entire construct. More particularly, embodiments of the present invention relate to a system and method for composing a URI scheme that identifies a resource within a package that is consistent with present URI formats, rules, and standards.

BACKGROUND OF THE INVENTION

A Uniform Resource Identifier (URI) is a compact string of characters for identifying an abstract or physical resource. A URI provides a simple and extensible means for identifying a resource for a client's need. A URI can be further classified as a name, a locator, or both. A Uniform Resource Name (URN) is a subset of URI that is required to remain globally unique and persistent even when the resource ceases to exist or becomes unavailable. A Uniform Resource Locator (URL) is also a subset of URI, and identifies resources through a representation of their primary access mechanism (location) rather than identifying the resource by name. URIs, URNs, and URLs are described further in detail in "Request for Comments: 2396" (RFC 2396).

When accessing information over a network, current technology utilizing URIs only provide a client the ability to access a package as a whole. Therefore, a client is forced to retrieve an entire package even when the client desires to have only one particular part of the package. For example, for the given URI "www.microsoft.com/sample.package," using existing URI schemes like Hypertext Transfer Protocol (HTTP), there is no current method to retrieve individual parts within the package, "sample.package," without having to access the entire package and then extracting the specific part on the client side.

Technology is needed among other things for enabling clients to address specific resources within packages, without a necessity to access the entire package.

This method should be universal and flexible, thereby able to coexist and stay consistent with the current URI formats, rules, and standards. The present invention addresses and solves these needs.

SUMMARY OF THE INVENTION

The present invention is directed to a system and method of accessing resources over a network. According to embodiments of the invention, a client may request a resource from a data store, wherein the resource is an individual part a package. A method according to embodiments of the invention may additionally include composing a pack URI, and requesting the resource by identifying it through the pack URI. Methods according to embodiments of the invention may further include retrieving the resource and storing the pack URI, along with the resource, in a cache within the client.

In further embodiments, a system may include at least one data store for storing a plurality of packages. The system may additionally include at least one resource stored within each package, and at least one pack URI for identifying the resources within each package.

In further embodiments of the present invention, a resource identifier scheme may provide a method of composing a pack URI using an algorithm, wherein the pack URI identifies a resource within a package. The resource identifier scheme may include composing a pack URI that is able to work with any scheme and is not protocol-specific. The resource identifier scheme may additionally include an algorithm for decomposing the pack URI into its main components.

DETAILED DESCRIPTION OF EMBODIMENTS

Figure 1:
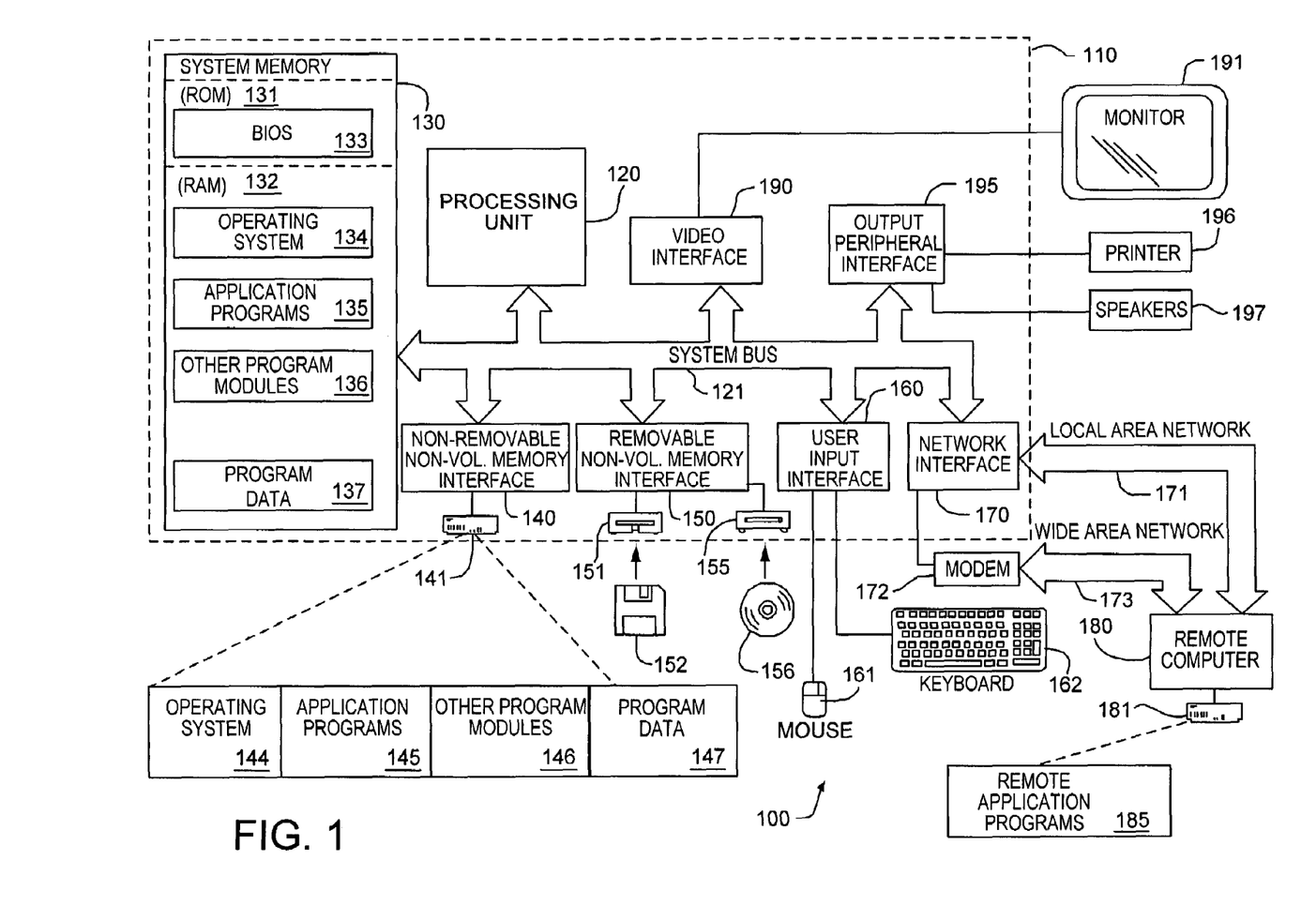
FIG. 1 illustrates a block diagram that illustrates a computing environment adapted to implement the present invention.

FIG. 1 is a block diagram that illustrates a computing environment in which a system and method for a pack URI scheme may operate according to embodiments of the present invention. The computing system environment 100 is only one example of a suitable computing or network environment and is not intended to suggest any limitation as to the scope, use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data.

Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through a output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Figure 2:
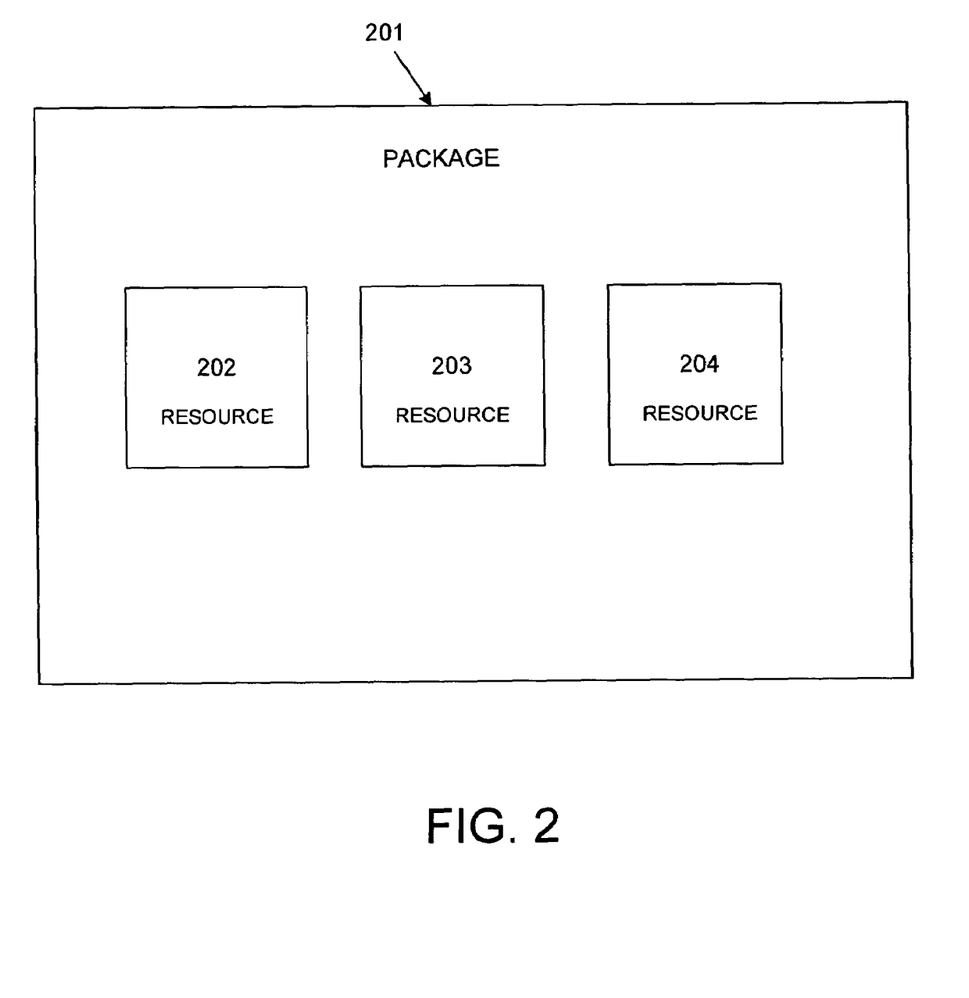
FIG. 2 illustrates a package of the present invention.
Figure 3:
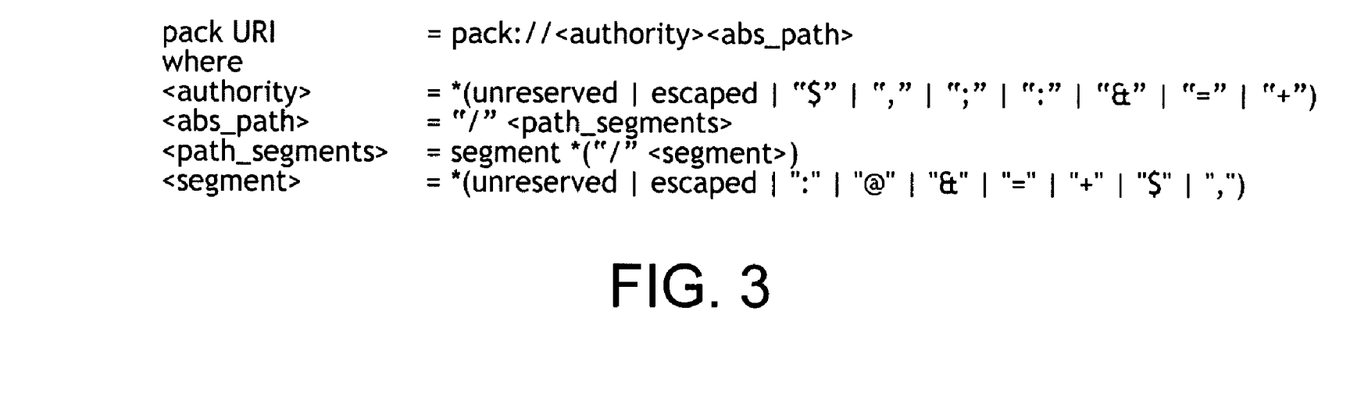
FIG. 3 illustrates the general form of a pack URI.

FIG. 2 illustrates a package construction according to embodiments of the present invention. A package 201 is a logical entity that holds a collection of resources 202-204. Resources are different parts within package 201 that could be or include, for example, individual files such as image, audio, HTML, and XML files, or other files, objects, or content. The package 201 may be stored at a data store, such as an external server, in which a client could download or access the package 201 over a network. The present invention allows a client to access the different resources 202-204 without needing to access the entire package 201. A client may address the different parts of the package 201 through the pack Uniform Resource Identifier (URI) schemes of the present invention as shown in FIG. 3.

The pack URI uses a technique of combined addressing that is consistent with known URI formatting. The pack URI is designed to be consistent with the standards set for in the "Request for Comments: 2396" (RFC 2396). The URI syntax is dependent upon the scheme. In general, absolute URI are written as follows:

<scheme>:<scheme-specific-part>

An absolute URI contains the name of the scheme being used (<scheme>) followed by a colon (":") and then a string (the <scheme-specific-part>) whose interpretation depends on the scheme. The URI syntax does not require that the scheme-specific-part have any general structure or set of semantics which is common among all URI. However, a subset of URI do share a common syntax for representing hierarchical relationships within the namespace. This "generic URI" syntax consists of a sequence of four main components:

<scheme>://<authority><path>?<query> each of which, except <scheme>, may be absent from a particular URI.

RFC2396 provides an extensible mechanism for defining new kinds of URIs based on new "schemes." Schemes are the prefix in a URI before the colon (e.g., "http", "ftp", "file"). The present invention, defines a specific URI scheme used to refer to parts in a package. The scheme name used in the present invention is "pack." A URI using the pack scheme is called a pack URI.

FIG. 3 illustrates a general form of a pack URI. The pack URI scheme is defined using the "generic URI" pattern from RFC2396 as shown in FIG. 3. In a pack URI, the authority component will contain an embedded URI that points to a package. The embedded URI should meet the requirements defined in RFC2396 for a valid absolute URI. The absolute path (abs_path) can be used to identify a particular part within the package identified by the embedded URI. When provided, the abs_path component describes a path to a part in the package. In order to identify a part, abs_path component must be an ASCII part name. When the <abs_path> is empty, the resource identified by the pack URI is the package as a whole.

A pack URI is composed of at least two main components: a package URI and a part URI. A part URI may be a resource within a given package that a client is interested in retrieving. The package URI is in one regard the package, container or object that contains the resource. In the format of a pack URI, the package URI takes the place of the authority component, and the part URI takes the place of the abs_path component. By remaining consistent with the generic URI format, and not deriving a specific approach or other syntax, the invention in one regard may enable applications to resolve relative references in a well known and defined fashion. Thus, the pack URI is universal and is not protocol-specific, and is able to work with a package URI of any scheme (http, ftp, file, etc.).

Figure 4:
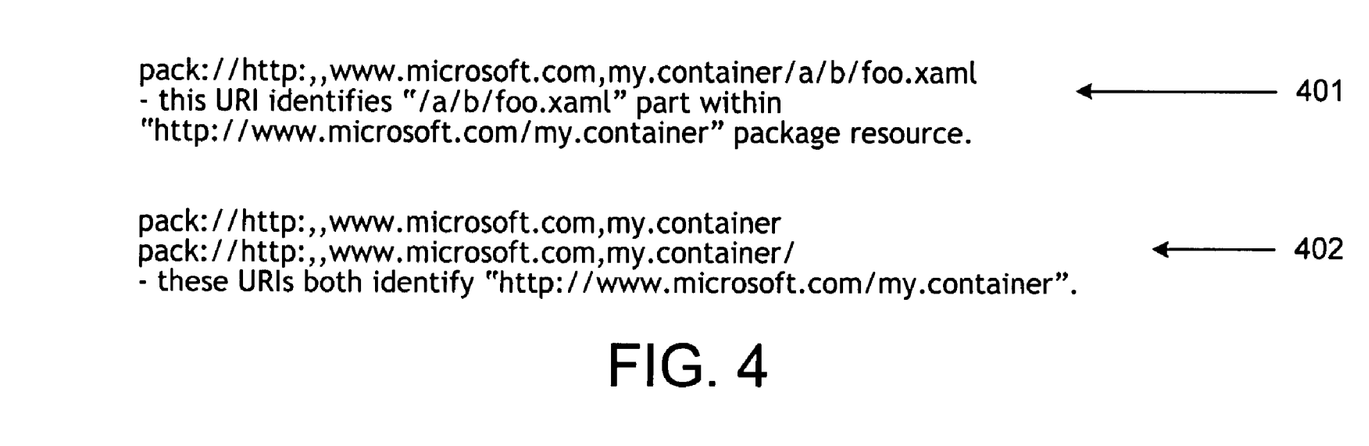
FIG. 4 illustrates examples of different pack URIs and the resources that each one addresses.

FIG. 4 illustrates examples of different pack URIs and the resources that each one addresses. In example 401, the first line illustrates the actual pack URI, while the second line identifies the part within the package of the third line. Note that the first "/" after the scheme delimiter "://" separates the package URI (authority component) from the part URI (abs_path component). As mentioned previously, a pack URI may address the entire package or a part within the package, and a pack URI with an empty path identifies the package as a whole. Example 402 illustrates this feature. Both pack URIs identify the same package as a whole. The second pack URI has a "/", however, the path is empty, therefore, the pack URI identifies the entire package.

Figure 5:
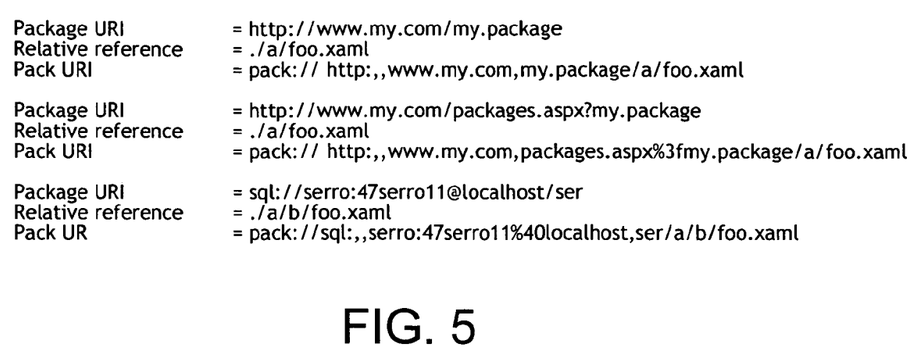
FIG. 5 illustrates examples of pack URIs composed from package URIs and relative references.
Figure 7:
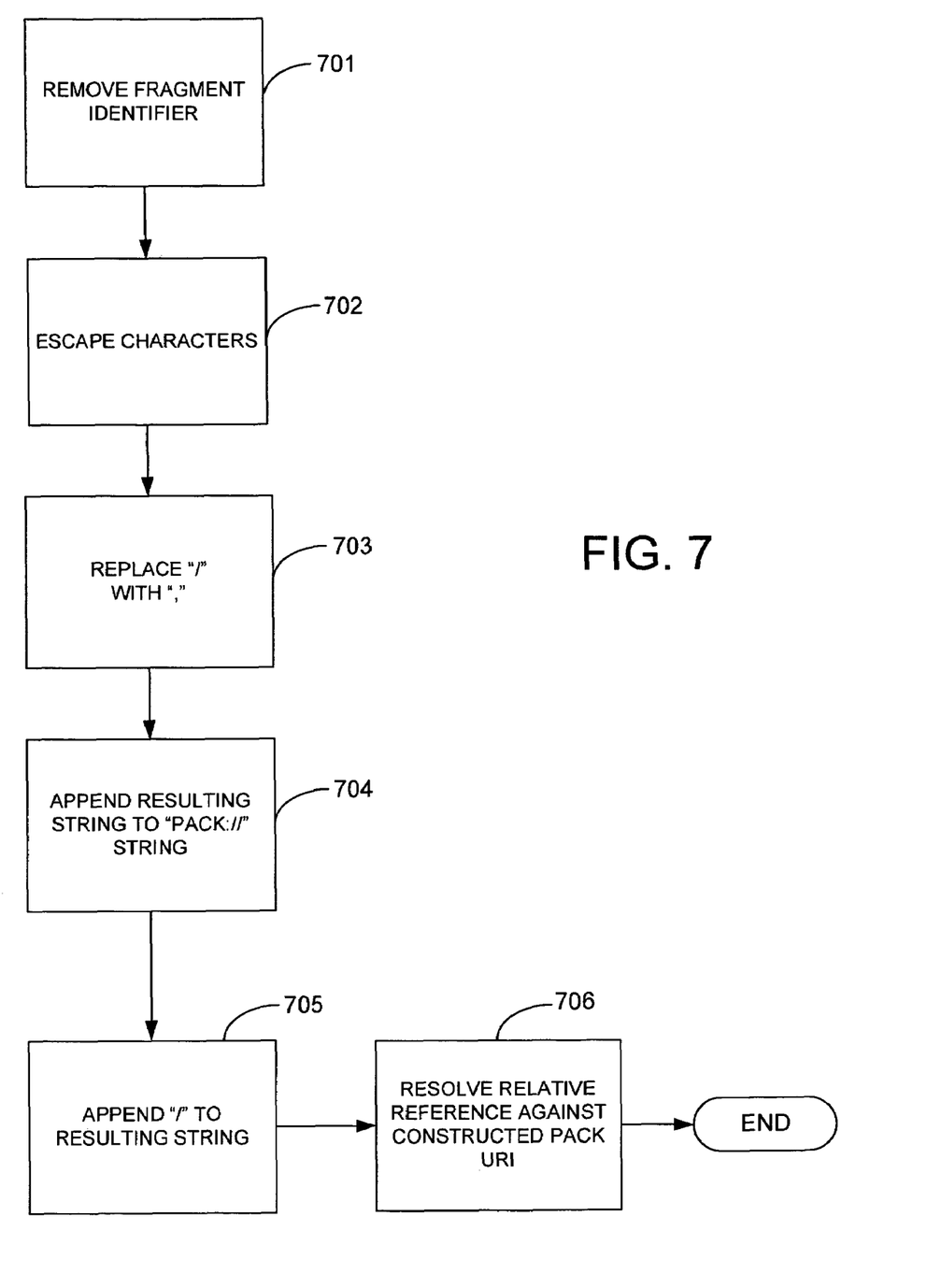
FIG. 7 illustrates how to compose a pack URI from an absolute package URI and a relative reference.

With reference to FIGS. 5 and 7, the following section will describe an algorithm for composing a pack URI from an absolute URI of a whole package and a relative reference. The relative reference may be considered to be the part component/URI before it is in absolute form. Absolute URI of a package resource to be suitable for composing a pack URI must fit RFC2396 requirements for valid absolute URIs.

FIG. 7 illustrates composition of a pack URI from an absolute package URI and a relative reference using syntactical conversions. In the composition of a pack URI, at least the following steps may be performed: In step 701, the fragment identifier is removed from the package URI, if it is present. Fragment identifiers are described more in detail in section 4.1 of RFC2396. In step 702, characters such as "%", "?", "@", "#" and "," are escaped in the package URI. In step 703, all "/" are replaced with "," in the resulting string. In step 704, the resulting string is appended to a "pack://" string. In step 705, "/" is appended to the resulting string. Constructed string represents a pack URI with blank abs_path component. In step 706, relative reference are resolved against constructed pack URI as a Base to a target absolute pack URI. Resolving is accomplished through an exemplary technique outlined in section 5.2 of RFC2396. Examples of pack URIs composed from package URIs and relative references are illustrated in FIG. 5.

The present invention also allows for pack URIs, that have been previously composed, to address another relative reference that may be a part of the same package. In order to accomplish this method, the present invention utilizes an exemplary resolving technique outlined in RFC2396 and referenced above. An example of composing a new pack URI, that addresses another package part, from an old pack URI is as follows: if a client has a pack URI— pack://http:,,www.microsoft.com,my.container/a/b/foo.x-aml and it wants to obtain another URI—

/images/pic1.jpg after resolving the two URIs, it will get the pack URI— pack://http:,,www.microsoft.com,my.container/images/pic1.jpg Once the pack URI is composed, a piece of code, software or other resource may be utilized in order to retrieve the resource from the data store that the pack URI addresses. This software or logic processes the pack URI to get the requested resource back to the client. In the processing step, the software may decompose the pack URI into its at least two main components, package URI and part URI, and will extract the requested part/resource from the package.

Figure 6A:
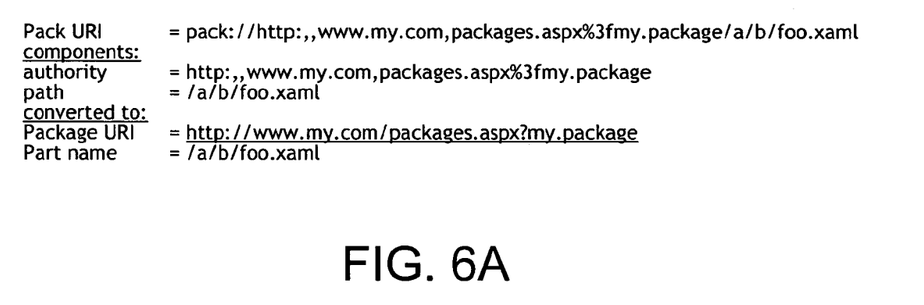
FIG. 6A illustrates an example of a pack URI being decomposed and converted into a package URI and a part URI.
Figure 6B:
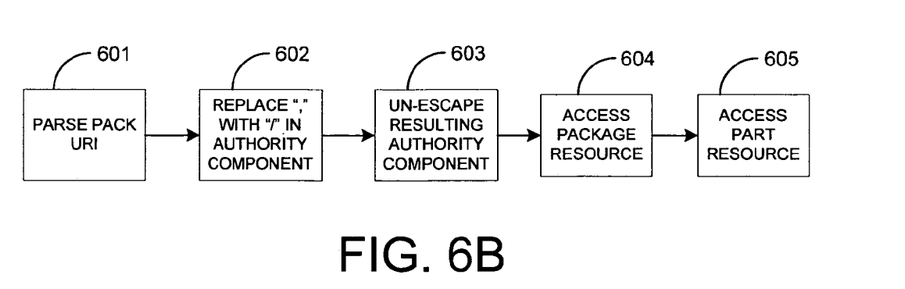
FIG. 6B illustrates an algorithm that describes decomposing a pack URI into its main components.

With reference to FIGS. 6A and 6B, the following will describe a technique of decomposing pack URIs. FIG. 6A illustrates an example of a pack URI being decomposed and converted into a package URI and a part URI. FIG. 6B illustrates an algorithm that describes decomposing a pack URI into certain components. FIG. 6B begins at step 601 wherein the pack URI is parsed into four potential components: scheme, authority, abs_path, and fragment identifier. The next step, 602, replaces all ","with "/" in the authority component. Next, the resulting authority component is un-escaped 603, and access to the package resource by the absolute URI represented by the converted authority component is given 604. Finally, the part resource is accessed in the package resource using abs_path as a part name 605.

Once a pack URI is composed and used to retrieve the given resource, the pack URI and resource may be stored in the client's cache for subsequent use. If a client requests a resource by composing a pack URI, an application running on the client may first compare the composed pack URI with previously-composed pack URIs stored within the cache. If the requested pack URI for the given resource is found within the cache, the application may retrieve the resource from the cache instead of unnecessarily retrieving it from the data store that the pack URI addresses.

Figure 8:
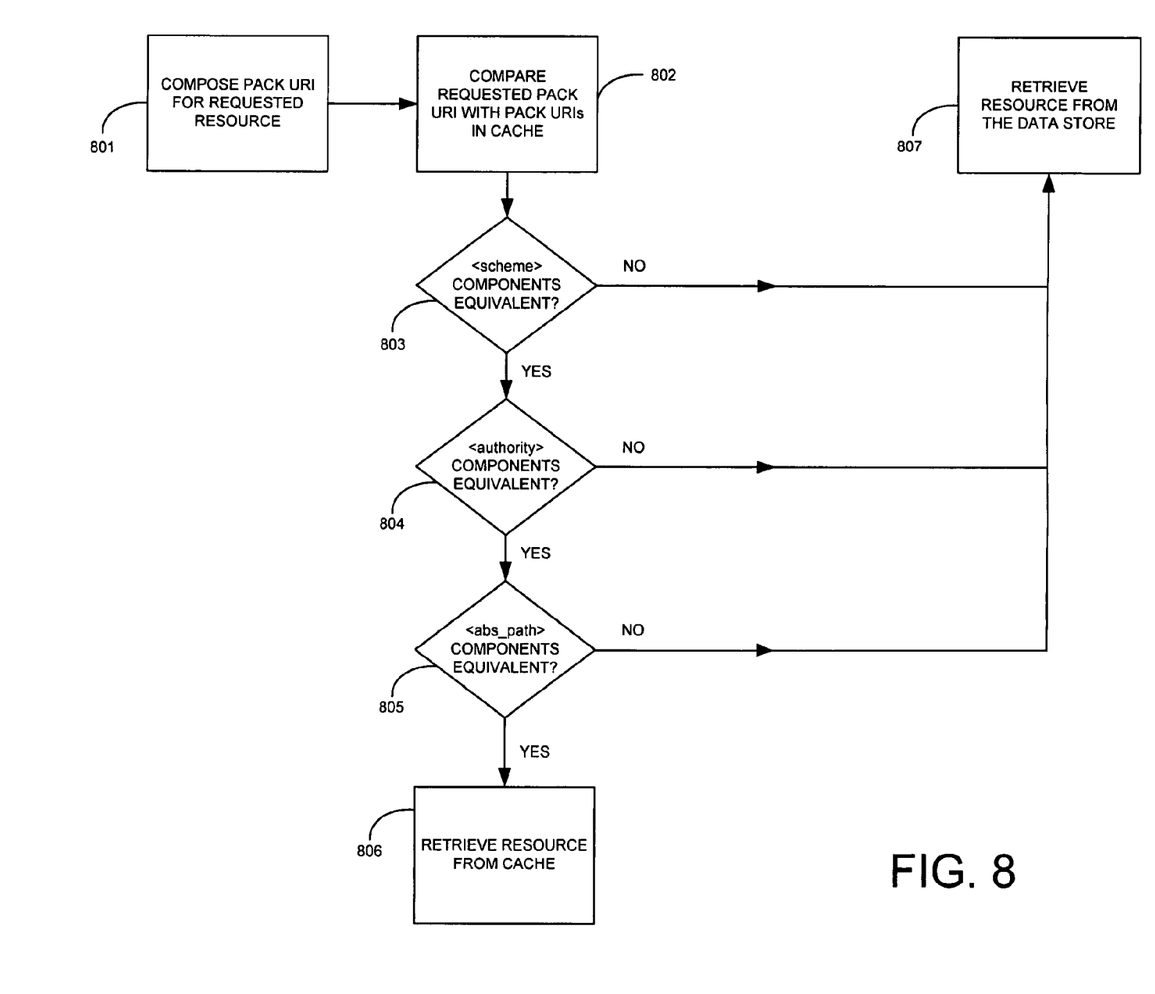
FIG. 8 illustrates a method of comparing pack URIs.

FIG. 8 illustrates the method of comparing pack URIs. In step 801, a pack URI is composed in order to retrieve a requested resource. Step 802 compares the composed URI with the list of previously-composed pack URIs stored in the client's cache. In the comparison step, the application checks for syntactical equivalence between the composed pack URI and the previously-composed pack URIs stored in the cache. In step 803, the scheme components of the pack URIs are first compared to determine if they are equivalent. The scheme components are equivalent if they are octet-by-octet identical after they are converted to lowercase. If at this point it is determined that the scheme components are not equivalent for any of the URIs stored in the cache, the application will proceed to retrieve the resource from the data store that the composed pack URI addresses 807. If it is determined that the scheme components are equivalent for any of the pack URIs, the application continues the comparison analysis by moving to step 804.

In step 804, the authority components of the pack URIs are next compared to check for equivalence. The rules for determining equivalence among authority components vary by scheme and may be similar to the rules outlined in RFC2396. If it is deemed that the authority components are not equivalent for any of the pack URIs stored in the cache, the application will proceed to retrieve the resource from the data store that the composed pack URI addresses 807. If it is determined that the authority components are equivalent for any of the pack URIs, the application continues the comparison analysis by moving on to step 805.

In step 805, the abs_path components of the pack URIs are compared to test for equivalence. The abs_path components are equivalent if they are octet-by-octet equivalent after being converted into Normalized Unicode Part names. If after the comparison analysis it is determined that the abs_path are not equivalent for any of the pack URIs stored in the cache, the application will proceed to retrieve the resource from the data store that the composed pack URI addresses. If it is determined that the abs_path components are equivalent for any of the pack URIs, the application determines that there is an equivalent pack URI stored in the cache and will proceed to retrieve the resource from the cache 806.

While particular embodiments of the invention have been illustrated and described in detail herein, it should be understood that various changes and modifications might be made to the invention without departing from the scope and intent of the invention. The embodiments described herein are intended in all respects to be illustrative rather than restrictive. Alternate embodiments will become apparent to those skilled in the art to which the present invention pertains without departing from its scope.

From the foregoing it will be seen that this invention is one well adapted to attain all the ends and objects set forth above, together with other advantages, which are obvious and inherent to the system and method. It will be understood that certain features and sub-combinations are of utility and may be employed without reference to other features and sub-combinations. This is contemplated and within the scope of the appended claims.

We claim:

1. A computer implemented method to access resources over a network, comprising:

recognizing a request from a client to access a resource, wherein the request includes an absolute Uniform Resource Identifier (URI) having a path to a whole package associated with a package, a relative reference associated with an individual part within the package, and a name of a scheme used to interpret syntax of the absolute URI;

requesting the resource from a data store, wherein the resource comprises the individual part stored within the package at the data store;

utilizing a pack scheme to compose a pack URI from the absolute URI, wherein the pack scheme is distinct from the named scheme and is not protocol specific, and wherein the composing comprises:
  (a) constructing a string from the whole package utilizing syntactical conversion; and
  (b) resolving the relative reference against the constructed string to provide the pack URI, wherein the pack URI comprises an authority component that points to the package and a path component that describes the individual part stored within the package;

identifying the package and the individual part of the package of the resource by decomposing the pack URI scheme, wherein decomposing comprises:
  (a) replacing the authority component with a package URI that represents the package; and
  (b) replacing the path component with a part URI that represents the individual part stored within the package; and utilizing the pack URI to extract the resource from the data store without accessing the package, wherein extracting comprises determining syntactical eciuivalence by comparing the plurality of previously-composed pack URIs schemes stored in a cache to the composed pack URI scheme, and wherein the resource is accessed from the cache if there is syntactical equivalence between the composed pack URI and one of the previously-composed pack URIs, and the resource is accessed from the data store that the pack URI addresses if there is no syntactical equivalence between the pack URI and any of the previously-composed pack URIs.

2. The method according to claim 1, further comprising accessing at least one of the resource and the package by utilizing the URI scheme to identify the resource or the package.

3. The method according to claim 1, wherein composing the pack URI comprises combining the package URI and the part URI.

4. The method according to claim 1, further comprising storing the pack URI, the retrieved resource, and a plurality of previously-composed pack URIs in the cache within the client's computing device.

5. The method according to claim 1, wherein the named scheme is based, in part, on prefix before the first colon of the absolute URI.

6. A computer implemented system to access resources over a network comprising:
at least one data store for storing a plurality of packages, at least one resource stored within each of the plurality of packages, and a pack URI that is composed for identifying the at least one resource stored within each of the plurality of packages,
a processor for utilizing a pack scheme to compose the pack URI from an absolute URI, wherein the absolute URI includes a path to a whole package associated with one of the plurality of packages, a relative reference associated with the at least one resource within the package, and a name of a scheme used to interpret syntax of the absolute URI,
wherein the pack scheme is distinct from the named scheme and is not protocol specific, wherein composing comprises constructing a string from the whole package utilizing syntactical conversion, and resolving the relative reference against the constructed string to provide the pack URI, wherein the pack URI comprises an authority component and a path component,
wherein the authority component points to one of the plurality of packages within the at least one data store,
wherein the path component describes the at least one resource stored within the package, wherein the client's computing device includes an application for comparing the pack URI against all of the plurality of previously-composed pack URI schemes stored in a cache to test for syntactical equivalence; and
wherein the at least one identified resource is accessed from the cache if there is syntactical equivalence between the pack URI and one or more of the plurality of previously-composed pack URI schemes, and is accessed from the at least one data store that the pack URI addresses if there is no syntactical equivalence between the pack URI and any of the plurality of previously-composed pack URI schemes.

7. The system according to claim 6, wherein a client accesses the at least one resource through the pack URI that addresses the at least one data store storing the package and the at least one resource stored within the package without having to access the entire package in which the resource is stored.

8. The system according to claim 7, wherein a computing device at the client includes the cache for storing the pack URI, the at least one resource stored within the package, and a plurality of previously-composed pack URI schemes.

9. The system according to claim 7, wherein the authority component is associated with the at least one resource that the client desires to access, and wherein the path component is associated with one of the plurality of packages that stores the desired resource.

10. A pack uniform resource identifier (URI), the pack URI being generated by a computer implemented method comprising:
recognizing a request for a resource from a data store, wherein the resource is an individual part of a plurality of parts stored within a package at the data store, wherein the absolute URI includes a path to a whole package associated with the package, a relative reference associated with the resource within the package, and a name of a scheme used to interpret syntax of the absolute URI;
utilizing the pack scheme to compose the pack URI, wherein the pack scheme is distinct from the named scheme and is not protocol specific, wherein composing comprises:
(a) constructing a string from the whole package utilizing syntactical conversion, and
(b) resolving the relative reference against the constructed string to provide the pack URI,
wherein the pack URI comprises an authority component and a path component; identifying the package and the resource stored therein by decomposing the pack URI, wherein the authority component points to the package at the data store and the path component describes the resource stored within the package; and
retrieving the resource from the data store,
determining syntactical equivalence by comparing a plurality of previously-composed pack URIs stored in a cache to the pack URI,
wherein comparing the pack URI to the previously-composed pack URIs involves comparing a scheme, an authority, and an abs path component to determine equivalence.

11. The pack uniform resource identifier according to claim 10, wherein the resource is retrieved from the data store that the pack URI addresses.

12. The pack uniform resource identifier according to claim 11, wherein the URI, through use of an algorithm, is decomposed into its main components before retrieving the resource.

13. The pack uniform resource identifier according to claim 10, wherein a previously-composed pack URI can be used to compose the pack URI that will identify the resource that is different than one or more prior resources identified by the previously-composed pack URI.

* * * * *